United States Patent [19]

Duffy et al.

[11] Patent Number: 5,685,680
[45] Date of Patent: Nov. 11, 1997

[54] COATED THREADED FASTENERS WITH COATING-FREE CRESTS

[75] Inventors: Richard J. Duffy, Shelby Township; Joseph R. Dudley, Southfield, both of Mich.

[73] Assignee: Nylok Fastener Corporation, MaComb, Mich.

[21] Appl. No.: 641,838

[22] Filed: May 2, 1996

[51] Int. Cl.$^6$ .................. F16B 35/04; F16B 37/06
[52] U.S. Cl. .................. 411/171; 411/411; 411/903; 411/914; 219/99
[58] Field of Search .................. 411/171, 302, 411/82, 258, 903, 914, 411; 427/183, 189, 198; 219/98, 99

[56] References Cited

U.S. PATENT DOCUMENTS

| | | |
|---|---|---|
| 4,545,712 | 10/1985 | Wallace .................. 411/302 X |
| 5,000,636 | 3/1991 | Wallace .................. 411/302 X |
| 5,190,424 | 3/1993 | Kazino et al. .................. 411/171 |
| 5,461,209 | 10/1995 | Yamada et al. .................. 411/171 X |

Primary Examiner—Neill H. Wilson
Attorney, Agent, or Firm—Niro, Scavone, Haller & Niro

[57] ABSTRACT

A method for fabricating a threaded fastener having a discontinuous coating of a contaminant-inhibiting coating material. In a preferred embodiment, the threaded fastener is formed so as to provide a coated fastener with substantially coating-free crests. The article resulting from the fabrication method also forms a part of the present invention. The resulting threaded fasteners include electrically conductive portions, allowing use of the fasteners in fabricating structural assemblies using welding techniques.

19 Claims, 2 Drawing Sheets

COATED THREADED FASTENERS WITH COATING-FREE CRESTS

BACKGROUND OF THE INVENTION

This invention generally relates to a coated threaded fastener that is coating-free over selected portions of the fastener's threads. More specifically, the present invention relates to a coated threaded fastener having coating-free thread crests that are electrically conductive, allowing the fastener to be used in a variety of applications requiring electrical conductivity.

The prior art discloses methods and apparatus for applying a substantially continuous fluropolymer coating onto substantially all of the threads of a threaded article to form a protective coating against a subsequently applied thread interfering contaminant (such as paint, primer, anti-corrosion inhibitors, weld splatter, etc.). See Reissue Patent No. Re. 33,776 (the '776 reissue patent), incorporated by reference herein. The methods and apparatus disclosed in the '776 reissue patent have proven highly successful. The coating method disclosed in the '776 reissue patent is particularly advantageous when used with fasteners subjected to electrodeposited paints or primers, since the high electrical resistance of the fused fluoropolymer coating is effective in preventing electrodeposition of these thread-interfering contaminants. However, the coating method disclosed in the '776 reissue patent typically coats substantially the entire thread portion of the fastener, thereby impeding the use of the fastener in fabrication techniques, such as drawn arc welding, which require intimate electrical contact between a welding electrode and the fastener. It would therefore be desirable in certain applications to provide a threaded fastener having selected portions coated with electrically resistant materials, but also including surfaces that are electrically conductive.

Accordingly, it is an object of the present invention to provide a discontinuously-coated threaded fastener having substantially coating-free thread crests.

It is another object of the present invention to provide a discontinuously-coated threaded fastener that retains resistance to the unwanted deposition of thread-interfering contaminants, while retaining sufficient electrical conductivity to permit use of the fastener in manufacturing operations requiring the fastener to have an electrically conductive surface.

SUMMARY OF THE INVENTION

The present invention preserves the advantages of known methods for coating threaded fasteners to avoid the deposition of thread-interfering materials, without inhibiting assembly, installation or use of the fasteners. In addition, it provides new advantages not available with known methods for coating threaded fasteners, and overcomes disadvantages associated with such methods.

The invention is generally directed to a method of fabricating a threaded fastener having a discontinuous coating of a contaminant-inhibiting material, such as a fused fluoropolymer resin powder (or deposition of a Teflon material from a liquid carrier, for example). In one preferred method of practicing the invention, a threaded fastener is provided which has a screw thread including a number of threads having crests and roots connected by flanks. The threaded fastener is heated, prior to coating the fastener, to a temperature sufficient to enable the contaminant-inhibiting coating to fuse and adhere to the threaded portion of the fastener. Then powder is applied to the heated threads to form a substantially continuous coating of the contaminant-inhibiting material. The coating has a minimum thickness sufficient to impede the deposition of subsequently-applied thread-interfering materials. Now, at least a portion of the coating is removed from the crests to thereby form a discontinuously-coated threaded fastener having substantially coating-free crests that provides an electrically conductive path between the fastener and an electrical source, while retaining its ability to substantially impede the deposition of the thread-interfering materials.

In one preferred embodiment, the substantially coating-free crests of the threaded fastener are sufficiently electrically conductive to allow the threaded fastener to be used in a drawn arc welding operation.

Preferably, the contaminant-inhibiting material is a fluoropolymer resin that forms a substantially uniform thermoplastic Teflon (such as Teflon P) coating which accumulates on the roots and flanks of the threaded portion of the fastener to form at least one of a substantially uniform masking, insulating and lubricating coating.

In one embodiment, the fastener includes external threads, and the coating is substantially removed from the crests by tumbling the fastener. Alternatively, the coating can be removed from the crests by using tooling that abrasively interacts with the fastener crests.

The article itself formed by the method of the present invention is also disclosed. In one embodiment, the article is an externally threaded fastener with a screw thread portion including a number of threads having crests and roots connected by flanks. The flanks and roots having a contaminant-inhibiting coating with a thickness sufficient to impede the deposition of subsequently-applied thread-interfering materials. The crests are substantially coating-free, providing a threaded fastener with a discontinuous coating that provides a conductive path between the fastener and an electrical source while retaining its ability to substantially impede the deposition of the thread-interfering materials. In one embodiment of a commonly-used externally threaded fastener, the crests have a crest width that is approximately ⅛ of the thread pitch. In alternative embodiments, the crest width ranges from ¹⁄₂₅ of the pitch for "V" threads to about 0.44 times the pitch for Acme stub threads. The coating is preferably a fused powder fluoropolymer resin coating (e.g., Teflon) that accumulates on the flanks and roots of the threaded fastener to form at least one of a substantially uniform masking, insulating and lubricating coating over the threaded portion of the fastener. Alternatively, the coating can be deposited from a liquid carrier.

Finally, a process for fabricating the article of the present invention is also disclosed. The process includes the steps of assembling a threaded fastener to a structural member, performing an operation which deposits a thread-interfering contaminant material on the assembled structural member and fastener, and joining the structural member to a structure by engaging the fastener with a mating fastener. The threaded fastener has a screw thread portion including a number of threads having crests and roots connected by flanks.

Now, the following process steps are performed on the fastener prior to assembly of the fastener to the structural member. First, the fastener is supported, for treatment. Next, the fastener is heated to a temperature sufficient to enable a contaminant-inhibiting material to fuse and adhere to the threads of the threaded fastener. A substantially continuous coating of the contaminant-inhibiting material is now deposited on the threaded portion of the fastener to thereby form a masked fastener that will impede deposition or retention of the subsequently applied thread-interfering material. Now, the coating is removed from the crests to thereby provide a discontinuously-coated threaded fastener having exposed, substantially coating-free crests. The exposed crests are then engaged with at least one welding electrode, and the discontinuously-coated threaded fastener is joined to the structural member by a welding technique. Finally, the structural member is joined to the structure by forming a threaded coupling between the discontinuously-coated threaded fastener and the mating fastener.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

DESCRIPTION OF THE PREFERRED EMBODIMENTS

Figure 1:
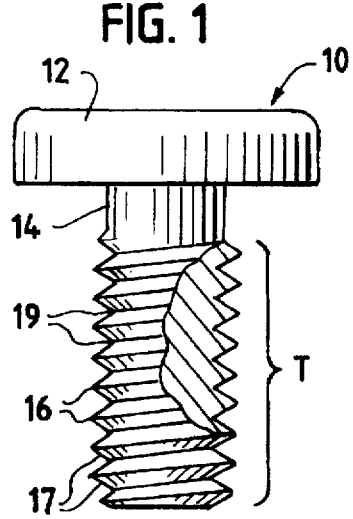
FIG. 1 is a side view, in partial cross-section, of an externally threaded fastener.

The present invention is advantageously used with externally threaded fasteners of a variety of shapes and sizes. FIG. 1 illustrates a conventional externally threaded fastener, designated generally as 10, which includes a head 12 and a shank portion 14. Shank portion 14 includes a screw thread portion "T" having a number of threads with crests 16 and roots 19 connected by flanks 17.

As used here, the term "screw thread" means a continuous and projecting helical ridge, usually of uniform section, on a cylindrical or conical surface. The term "thread" is that portion of the screw thread encompassed by one pitch. (On a single-start thread is it equal to one turn.) The term "crest" means that surface of a thread which joins the flanks of the thread and is farthest from the cylinder or cone from which the thread projects. The term "root" means that surface of a thread which joins the flanks of adjacent threads and is immediately adjacent to the cylinder or cone from which the thread projects. The term "flank" means either surface of the thread connecting the crest with the root.

Figure 2:
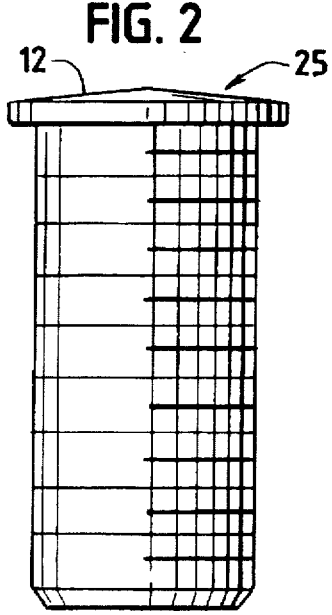
FIG. 2 is a schematic view of one type of an externally threaded fastener which can be coated according to the present invention.
Figure 3:
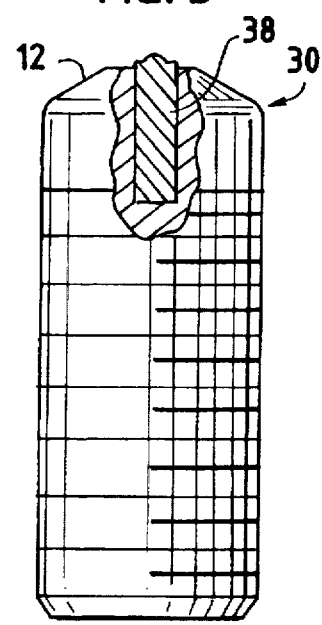
FIG. 3 is a schematic view of a second type of an externally threaded fastener, including flux, which can be coated according to the present invention.

FIGS. 2 and 3 show schematic views of externally threaded fasteners 25 and 30, respectively, that can be discontinuosly coated according to the present invention, as will now be explained. Fastener 30 of FIG. 3 includes a flux portion 38 which melts and flows to the joint interface between the fastener surface and a mating member during welding to facilitate the welding process, in a manner well-known to those of skill in the welding art.

To practice the present invention, threaded fasteners 25 or 30 (for example) are heated in any manner well known in the art. As is also well known, a stream of a fluoropolymer resin material is directed onto the heated threads to coat the outer surface of the fastener's threaded portion. (As used here the term "fluoropolymer resin material" is broadly defined to include, but is not limited to, thermoplastic fluoropolymers or fluorocarbon materials; Teflon-type compounds; and other plastic type compounds.) This fluoropolymer resin coating serves to inhibit the deposition of subsequently-applied thread contaminant materials, such as paint, primer or weld splatter, and preferably forms a substantially uniform masking and insulating coating. This coating also preferably has a high electrical resistance to prevent the electrodeposition of thread-interfering materials such as paints or primers on the threaded fastener, which can interfere with the subsequent use or assembly of the fastener to mating parts. Since this high electrical resistance can be a disadvantage if the fastener is to be used in an application requiring electrical conductivity (such as drawn arc welding), a discontinuous coating for the threaded fastener which will allow electrical conductivity can be formed, as will now be described.

After heat-fusing the fluoropolymer resin onto the fastener and allowing the fused resin to cool into a substantially continuous coating, portions of the coating are removed from the crests of the threads. In one preferred removal method, the coated fasteners are tumbled in media so that only the crests are abraded, leaving the coating on the flanks and roots of the threaded fastener. Tumbling the coated fasteners results in a threaded article with "substantially coating-free crests," defined here as crests that are sufficiently exposed to provide a conductive path between the fastener and an electrical source for a given application (e.g., to permit intimate contact with welding electrodes in order to satisfactorily carry out welding operations, such as drawn arc welding techniques). Yet the remainder of the fastener threads, to the extent required or desired, remains coated with the contaminant-inhibiting coating material.

Figure 4:
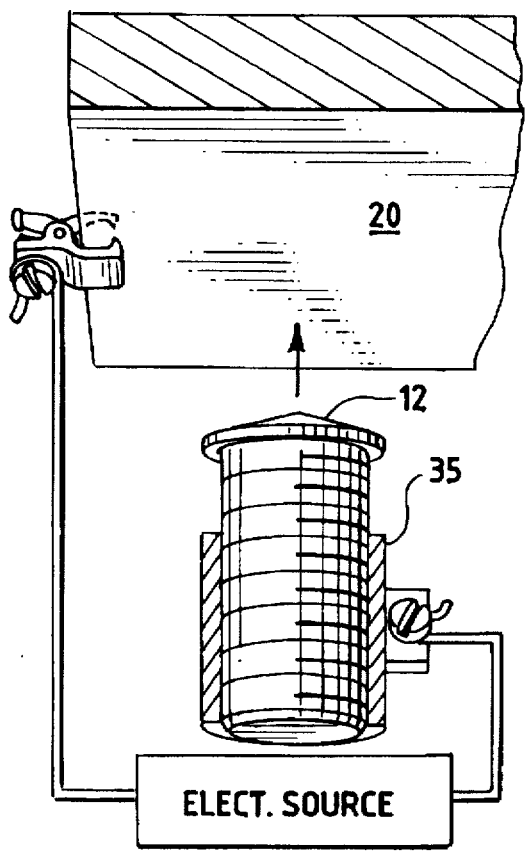
FIGS. 4-6 are schematic views illustrating steps involved in welding a threaded stud to a structural member.
Figure 5:
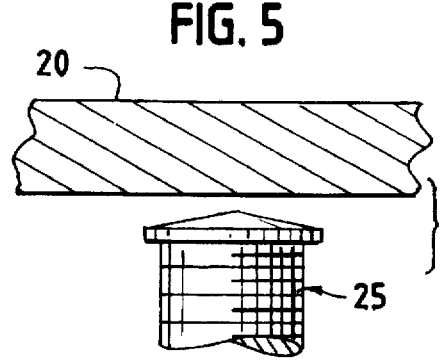
Figure 6:
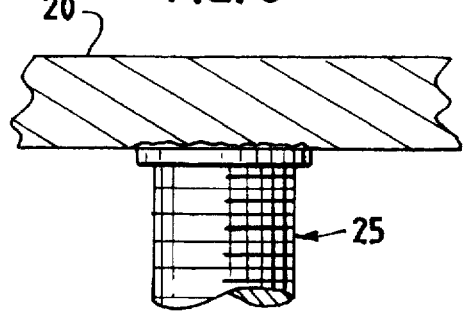

Referring now to FIGS. 4-6, the exposed crests of the threaded fastener can now be engaged with a welding electrode in a drawn arc welding operation, as now described. In one example, a collet-type welding electrode 35, which consists of a metal sheath encircling a portion of the fastener, is used. An electrical current is applied to the fastener through the electrode using an electrical source E, and heat is generated at the juncture of the fastener head 12 and another electrically conductive structural surface, such as metal plate surface 20, welding the fastener to the structural surface to form a welded assembly, as shown in FIG. 6. This step can be repeated as required to weld any number of fasteners to the structural surface. Those of skill in the welding art will understand that there may be other welding operations that can be advantageously employed with the present invention. The assembly with the welded fasteners can now be joined to another structural member, using a second set of fasteners (not shown) that mate or couple with the first set of (welded) fasteners.

Figure 8:
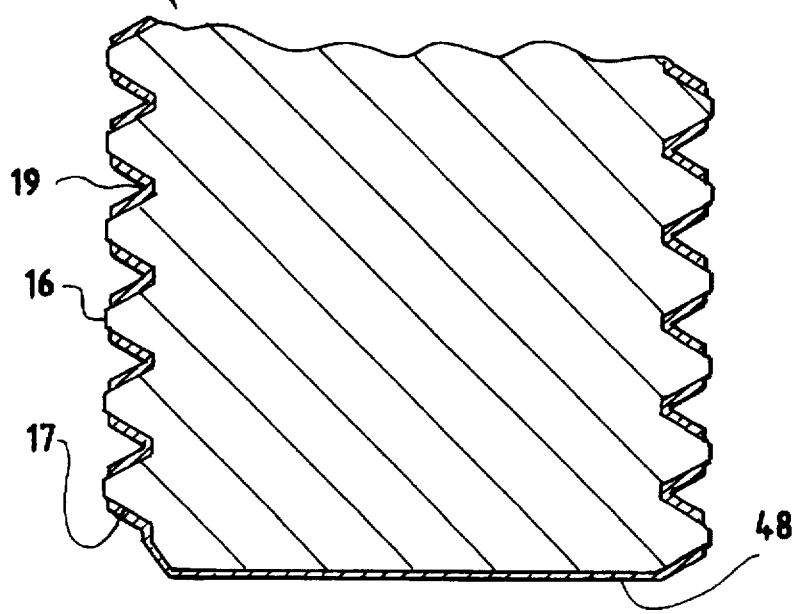
FIG. 8 is a partial side view of an externally threaded fastener having a discontinuous-coating in accordance with to the present invention.

FIG. 8 shows a portion of an externally threaded fastener with the discontinuous coating of the present invention. As shown, crests 16 are free of the contaminant-inhibiting coating, while the remaining threaded portions (flanks 17 and roots 19) are coated. While the tip or end 48 of the fastener is shown as being coated, this may not be necessary in certain fastener applications. It will be recognized that the thickness of the contaminant-inhibiting coating should be sufficient to substantially impede the deposition of thread-interfering contaminants. Otherwise, the contaminants can interfere with assembly of the threaded fastener to a structural member and a mating fastener.

Figure 7:
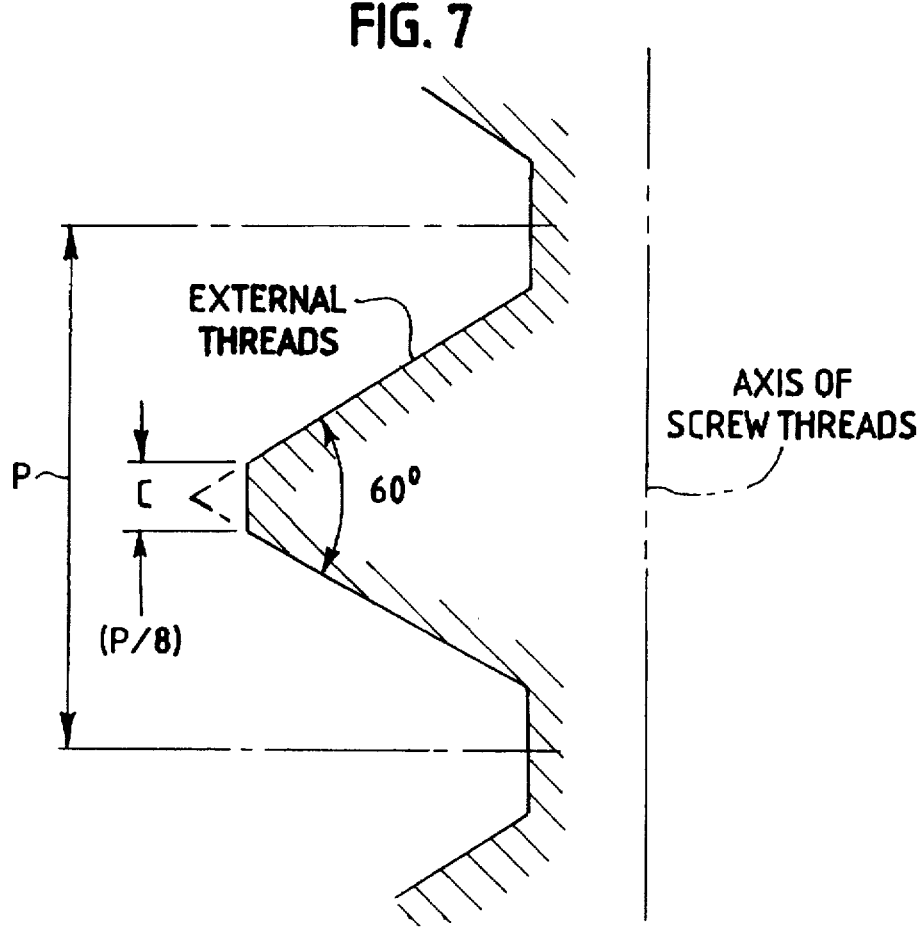
FIG. 7 is a schematic view showing various industry-recognized dimensions for an externally threaded fastener.

Referring now to FIG. 7, a partial view of the commonly-known standard ANSI B1.13M (1979) for metric screw theads (M profile) is shown. For an externally threaded fastener, the crest width "C" is ⅛ of the thread pitch "P". Crest width ranges for other commonly-used threaded fasteners range from ½₅ of the pitch for "V" threads, to about 0.44 times the pitch for Acme stub threads. It has been found that if the coating is substantially removed over the extent of the crest width for an externally threaded fastener, for example, this will result in crests that are sufficiently exposed to permit contact and electrical conductivity with welding electrodes in order to carry out welding operations.

Those of skill in the art will appreciate that the existence of thread-interfering contaminants, such as paints, primers or weld splatter, can inhibit the ability of the threaded fastener to form a proper threaded coupling with a second, mating fastener. However, it has been found that the deposition of paint or other thread-interfering contaminants along the crest width of the fastener (as shown in FIG. 8) does not cause significant interference with subsequent use or assembly of the threaded fastener to a mating fastener. However, intimate contact must be maintained between the exposed metal crests and the welding electrode. It is therefore undesirable for coating to contact the electrode, and if the coating is not substantially removed from the crest width, any remaining coating on the crest width (particularly if an effective insulator such as Teflon is used) will result in the coating contacting the electrode, possibly causing arcing, increasing the power requirements for the welding operation, and possibly welding shut or melting the electrode. However, it has been found that the coating that remains on the thread flanks will not interfere with the conductive path formed by the exposed crests.

Various other methods to remove the contaminant-inhibiting coating from portions of the threaded fastener using techniques other than tumbling will be known to those skilled in the art. For example, the coating can be removed from the crests using abrasion techniques using tooling that employs (for example) a high speed rotary action.

While fluoropolymer resin powders have proven effective for use as contaminant-inhibiting coating materials and are well-suited for use with the above-described techniques, it will be appreciated that Teflon coatings deposited from a liquid vehicle can also be used, and can be removed from the thread crests to provide enhanced electrical conductivity.

Finally, it will be understood that the invention may be embodied in other specific forms without departing from its spirit or central characteristics. The present examples and embodiments, therefore, are to be considered in all respects as illustrative and not restrictive, and the invention is not to be limited to the details given here.

We claim:

1. An externally threaded fastener that includes a screw thread with crests and roots, comprising:

the screw thread with the exception of the crests, having a contaminant-inhibiting coating with a thickness sufficient to impede the deposition of subsequently-applied thread-interfering materials; and the crests being substantially coating-free, thereby providing a threaded fastener having a discontinuous coating and a conductive path between the fastener and an electrical source while retaining its ability to substantially impede the deposition of the thread-interfering materials.

2. The threaded fastener of claim 1, wherein the crests have a crest width that is approximately ⅛ of the thread pitch.

3. The threaded fastener of claim 1, wherein the threaded fastener includes "V" threads and the crests have a crest width that is approximately ½₅ of the thread pitch.

4. The threaded fastener of claim 1, wherein the threaded fastener includes Acme stud threads and the crests have a crest width that is approximately 0.44 times the pitch.

5. The threaded fastener of claim 1, wherein the coating is fluoropolymer resin coating that accumulates on the flanks and roots of the threaded fastener to form at least one of a substantially uniform masking, insulating and lubricating coating over the threaded portion of the fastener.

6. An externally threaded fastener that includes a screw thread with crests and roots connected by flanks, comprising:

the screw thread, with the exception of the crests, having a contaminant-inhibiting, fused powder coating with a thickness sufficient to impede the deposition of subsequently-applied thread-interfering materials; and the crests being substantially coating-free, thereby providing a threaded fastener having a discontinuous coating and a conductive path between the fastener and an electrical source while retaining its ability to substantially impede the deposition of the thread-interfering materials.

7. An externally threaded fastener that includes a screw thread with crests and roots connected by flanks, comprising:

the screw thread, with the exception of the crests, having a contaminant-inhibiting coating applied in liquid form, the coating having a thickness sufficient to impede the deposition of subsequently-applied thread-interfering materials; and the crests being substantially coating-free, thereby providing a threaded fastener having a discontinuous coating and a conductive path between the fastener and an electrical source while retaining its ability to substantially impede the deposition of the thread-interfering materials.

8. A method of fabricating a fastener having a coating of a contaminant-inhibiting material, comprising the steps of:

(a) providing a threaded fastener that includes a screw thread with crests and roots;

(b) depositing a coating of the contaminant-inhibiting material on the screw thread of the fastener, the coating having a minimum thickness sufficient to impede the deposition of subsequently-applied thread-interfering materials; and (c) removing at least a portion of the coating from the crests to thereby form a discontinuously-coated fastener having substantially coating-free crests, wherein an electrically conductive path is provided between the fastener and an electrical source, and the fastener retains its ability to substantially impede the deposition of the thread-interfering materials.

9. The method of claim 1, wherein the contaminant-inhibiting coating is formed from a resin powder, and further comprising the step of heating the threaded fastener to a temperature sufficient to enable the resin powder to fuse and adhere to the threaded portion of the fastener.

10. The method of claim 1, wherein the substantially coating-free crests are sufficiently electrically conductive to allow the threaded fastener to be used in a drawn arc welding operation.

11. The method of claim 1, wherein the contaminant-inhibiting material is a fluoropolymer resin.

12. The method of claim 1 wherein the contaminant-inhibiting material is a substantially uniform thermoplastic Teflon P coating.

13. The method of claim 1, wherein the fastener includes external threads, and the coating is substantially removed from the crests by tumbling the threaded fasteners.

14. The method of claim 1, wherein the step of removing the coating from the crests of the fastener is accomplished using tooling that abrasively interacts with the fastener crests.

15. The method of claim 1, wherein the contaminant-inhibiting coating covers at least a portion of the screw thread in a substantially continuous manner, with the exception of the crests.

16. A method of fabricating a threaded fastener having a discontinuous coating of a contaminant-inhibiting material, comprising the steps of:

(a) providing a threaded fastener having an external threaded portion;

(b) depositing a substantially continuous coating of the contaminant-inhibiting material on the threaded portion of the fastener, the coating having a minimum thickness sufficient to impede the deposition of subsequently-applied thread-interfering materials; and (c) removing the coating from a part of the external threaded portion to thereby provide a discontinuously-coated threaded fastener that retains its ability to substantially impede the deposition of the thread-interfering materials while providing a conductive path between the fastener threads and an electrical source.

17. A method of fabricating a threaded fastener having a discontinuous coating of a contaminant-inhibiting material sufficient to impede the deposition of subsequently-applied thread-interfering materials, comprising the steps of:

(a) providing a threaded fastener that includes a screw thread with crests and roots;

(b) heating the threaded fastener to a temperature sufficient to enable the contaminant-inhibiting coating to fuse and adhere to the threaded portion of the fastener;

(c) depositing a substantially continuous coating of the contaminant-inhibiting material on the screw thread of the heated fastener; and (d) removing the coating from the crests to thereby provide a discontinuously-coated threaded fastener having substantially coating-free crests yet which retains its ability to substantially impede the deposition of the thread-interfering materials.

18. In a process for the fabrication of an article including the steps of assembling an externally threaded fastener to a structural member, performing an operation which deposits a thread-interfering contaminant material on the assembled structural member and fastener, and joining the structural member to a structure by engaging the fastener with a mating fastener, the threaded fastener including a screw thread with crests and roots, the improvement comprising performing the following steps on the fastener prior to assembly of the fastener to the structural member:

supporting the fastener for treatment;

forming a coating of the contaminant-inhibiting material on the screw thread of the fastener to thereby form a masked fastener that will impede deposition or retention of the subsequently applied thread-interfering material;

removing the coating from the crests to thereby provide a discontinuously-coated threaded fastener having exposed, substantially coating-free crests;

engaging the exposed crests with at least one welding electrode;

joining the discontinuously-coated threaded fastener to the structural member by a welding technique; and joining the stuctural member to the structure by forming a threaded coupling between the discontinuously-coated threaded fastener and the mating fastener.

19. The process of claim 18, further comprising the step of heating the threaded fastener to a temperature sufficient to enable the contaminant-inhibiting material to fuse and adhere to the screw thread of the fastener.

* * * * *

UNITED STATES PATENT AND TRADEMARK OFFICE
CERTIFICATE OF CORRECTION

PATENT NO. : 5,685,680

DATED : November 11, 1997

INVENTOR(S) : Richard J. Duffy and Joseph R. Dudley

It is certified that error appears in the above-identified patent and that said Letters Patent is hereby corrected as shown below:

In Claim 9, Column 6, Line 59, --"1" should read --8--
In Claim 10, Column 6, Line 64, --"1" should read --8--
In Claim 11, Column 7, Line 1, --"1" should read --8--
In Claim 12, Column 7, Line 3, --"1" should read --8--
In Claim 13, Column 7, Line 6, --"1" should read --8--
In Claim 14, Column 7, Line 9, --"1" should read --8--
In Claim 15, Column 7, Line 13, --"1" should read --8--

Signed and Sealed this

Seventeenth Day of February, 1998

Attest:

BRUCE LEHMAN

Attesting Officer

Commissioner of Patents and Trademarks